United States Patent
Debouk et al.

(10) Patent No.: US 8,618,922 B2
(45) Date of Patent: Dec. 31, 2013

(54) METHOD AND SYSTEM FOR ENSURING OPERATION OF LIMITED-ABILITY AUTONOMOUS DRIVING VEHICLES

(75) Inventors: Rami I. Debouk, Dearborn, MI (US); Barbara J. Czerny, Clarkston, MI (US); Joseph G. D'Ambrosio, Clarkston, MI (US); Jeffrey Joyce, North Vancouver (CA); Massimo Osella, Troy, MI (US); Vijaya Vittal Ramachandra, Hyderabad (IN)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 13/042,704

(22) Filed: Mar. 8, 2011

(65) Prior Publication Data

US 2011/0241862 A1    Oct. 6, 2011

Related U.S. Application Data

(60) Provisional application No. 61/319,197, filed on Mar. 30, 2010.

(51) Int. Cl.
*B60Q 1/00* (2006.01)
*G01C 22/00* (2006.01)

(52) U.S. Cl.
USPC .............................. 340/439; 340/576; 701/23

(58) Field of Classification Search
USPC .............. 340/575, 576, 435, 573.1, 439, 475, 340/901; 701/1, 45, 70, 23; 180/169, 272
See application file for complete search history.

(56) References Cited

U.S. PATENT DOCUMENTS

| | | | | |
|---|---|---|---|---|
| RE36,470 E | * | 12/1999 | Woll et al. | 342/71 |
| 2004/0262063 A1 | * | 12/2004 | Kaufmann et al. | 180/169 |
| 2008/0252466 A1 | * | 10/2008 | Yopp et al. | 340/576 |

* cited by examiner

*Primary Examiner* — Anh V La (57) ABSTRACT

A method for ensuring operation of a limited-ability autonomous driving enabled vehicle includes monitoring a plurality of specific conditions necessary for preferred and reliable use of limited-ability autonomous driving, and initiating a fault handling and degradation strategy configured to maneuver the vehicle to a preferred state if the driver is unable to manually control the vehicle when at least one of the specific conditions is either violated or will become violated.

19 Claims, 3 Drawing Sheets

METHOD AND SYSTEM FOR ENSURING OPERATION OF LIMITED-ABILITY AUTONOMOUS DRIVING VEHICLES

CROSS REFERENCE TO RELATED APPLICATIONS

This application claims the benefit of U.S. Provisional Application No. 61/319,197, filed on Mar. 30, 2010, which is incorporated herein by reference.

TECHNICAL FIELD

This disclosure is related to limited-ability autonomous driving in road vehicles.

BACKGROUND

The statements in this section merely provide background information related to the present disclosure and may not constitute prior art.

Autonomous driving systems and limited-ability autonomous driving systems utilize inputs regarding the road, environment, and other driving conditions to automatically control throttle, braking and steering mechanisms. Accurate estimation and identification of a clear path over which to operate a motor vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology preferentially includes accurately perceiving objects and continuing to effectively navigate around such objects.

Technological methods for perceiving an object include data from visual cameras and radar imaging. Cameras translate visual images in the form of radiation such as light patterns or infrared signatures into a readable data format. Cameras can additionally be utilized to monitor lane markers on a roadway in which a vehicle is traveling. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated. GPS and wireless technology can additionally determine approaching intersections, lane endings, and congested areas due to traffic.

In any autonomous driving system, it is critical that the operator of a vehicle maintain adequate situational awareness so that the operator is prepared to intervene when traffic conditions and external conditions require. Additionally, physical failures of the autonomous driving system must be monitored to prevent malfunction of the autonomous driving system.

Known methods detect the attentiveness of the operator and alert the driver that a response is required if an internal fault is detected. However, these known methods fail to operate the vehicle autonomously and maneuver the vehicle to a preferred sate when attentiveness of the operator cannot be re-gained.

SUMMARY

A method for ensuring operation of a limited-ability autonomous driving enabled vehicle includes monitoring a plurality of specific conditions necessary for preferred and reliable use of limited-ability autonomous driving, and initiating a fault handling and degradation strategy configured to maneuver the vehicle to a preferred state if the driver is unable to manually control the vehicle when at least one of the specific conditions is either violated or will become violated.

BRIEF DESCRIPTION OF THE DRAWINGS

One or more embodiments will now be described, by way of example, with reference to the accompanying drawings, in which.

DETAILED DESCRIPTION

Figure 1:
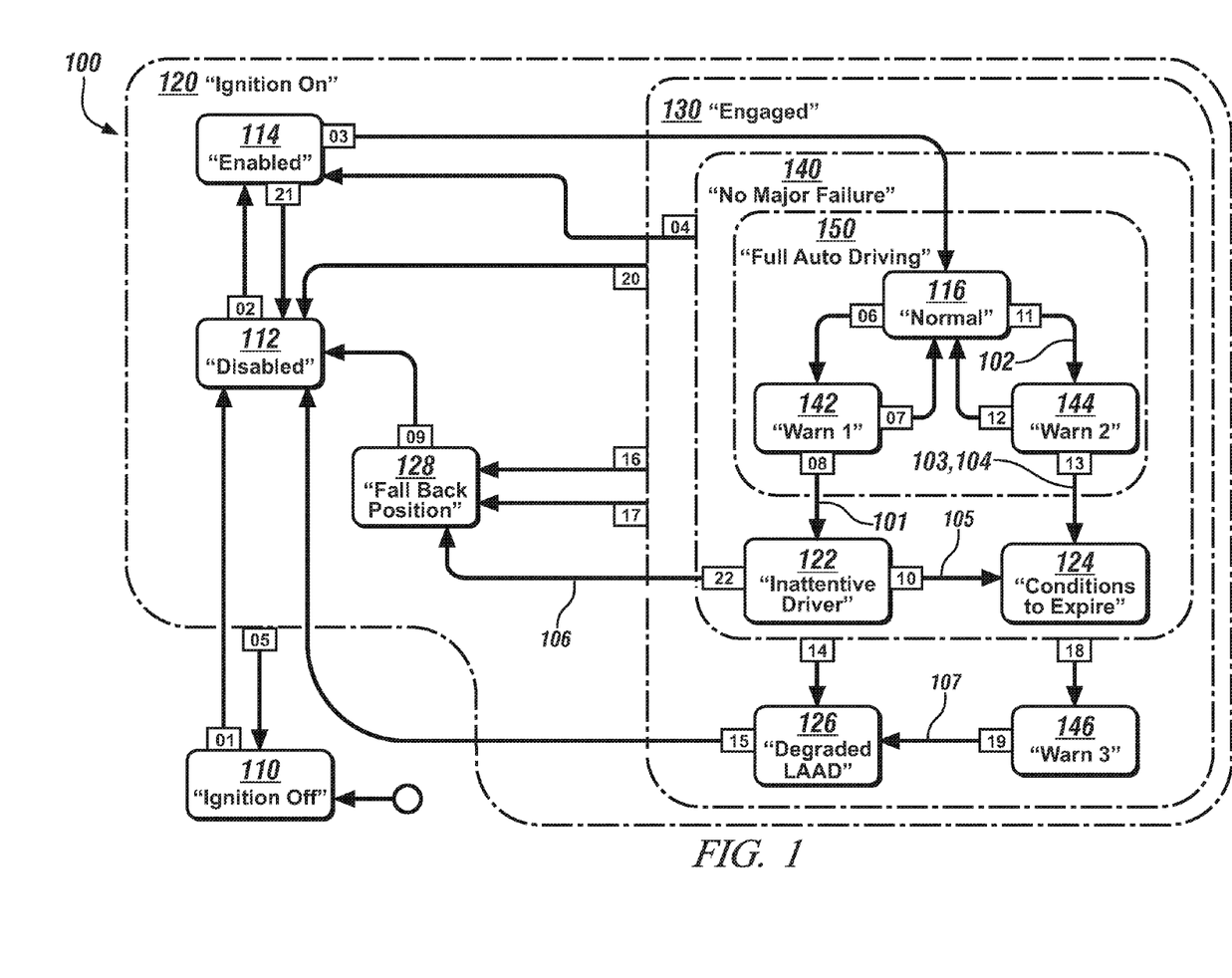
FIG. 1 is an exemplary state flowchart of a limited-ability autonomous driving system including states of the system and possible state transitions, in accordance with the present disclosure.

Referring now to the drawings, wherein the showings are for the purpose of illustrating certain exemplary embodiments only and not for the purpose of limiting the same, FIG. 1 illustrates a state flowchart of a system 100 for employing limited-ability autonomous driving (hereinafter 'LAAD') and for ensuring preferred operation by initiating a fault handling and degradation for limited-ability autonomous driving when one or more specific conditions necessary for use of LAAD no longer exist or will no longer exist in accordance with an exemplary embodiment of the present disclosure. The specific conditions necessary for use of LAAD include: satisfying operator attentiveness criteria, the system 100 availability to provide preferred and reliable LAAD, and external conditions that allow for preferred use of LAAD. The system 100 availability to provide preferred and reliable use of LAAD is determined by not detecting any diagnostic conditions indicative of systematic failures/internal faults that would impede the use of preferred and reliable LAAD. The external conditions that allow for preferred and reliable use of LAAD can include road and environment conditions that can impede the use of preferred and reliable LAAD. LAAD corresponds to the system 100 having the ability to control steering, braking and throttle of the vehicle independent of operator input; however, the vehicle operator can have the ability to select between several different modes of LAAD including, but not limited to, any combinations between adaptive cruise control (ACC), lane keeping or centering, and lane changing. Fault handling and degradation corresponds to situations where LAAD is employed but one or more of the specific conditions necessary for preferred and reliable use of LAAD no longer exist (e.g., violated) or will no longer exist, wherein attempts are made to warn the operator to take control of the vehicle, but these attempts are unsuccessful, and thus, the fault handling and degradation strategy will maneuver the vehicle to a "preferred" state if driver attentiveness cannot be re-gained. The terms "operator" and "driver" may be used interchangeably herein.

If the system 100 determines that the operator attentiveness criteria is not satisfied, diagnostic conditions indicate systematic failures/internal faults impeding the availability of preferred and reliable use of LAAD or external conditions that allow for preferred and reliable use of LAAD will no longer exist, degraded use of LAAD is apparent and the system 100 ensures preferred operation of LAAD via the fault handling and degradation strategy, to warn the driver and, if necessary, maneuver the vehicle into a "preferred" state.

Table 1 is provided as a key to FIG. 1 wherein the numerically labeled blocks and the corresponding functions are set forth as follows.

TABLE 1

FIG. 1

| BLOCK | BLOCK CONTENTS |
| --- | --- |
| 110 | "Ignition Off" superstate, indicating ignition is off. |
| 112 | "Disabled" state, limited-ability autonomous driving is disabled and diagnostics are periodically being checked. |
| 114 | "Enabled" state, LAAD is enabled and available to the driver. |
| 116 | "Normal" state, LAAD is active and no specific conditions exist |
| 120 | "Ignition On" superstate, including every state of the system when vehicle ignition is on |
| 122 | "Inattentive Driver" state, operator has been inattentive for TBD1 101 seconds since the operator was first warned to become attentive and is now deemed inattentive. |
| 124 | "Conditions to Expire" state, conditions necessary for preferred and reliable LAAD are deemed to expire. |
| 126 | "Degraded LAAD" state, performance of LAAD is degraded. |
| 128 | "Fall Back Position" state, maneuvers vehicle to a preferred state. |
| 130 | "Engaged" superstate, includes blocks 116, 142, 144, 146, 122, 124, and 126, wherein operation of LAAD is engaged |
| 140 | "No Major Failure" superstate, includes blocks 116, 142, 144, 122 and 124 indicating no threatening, urgent or critical failures have occurred. |
| 142 | "Warn1" state, driver is not satisfying attentiveness criteria and is warned. |
| 144 | "Warn2" state, driver warned that conditions are expected to expire and driver is warned to take control. |
| 146 | "Warn3" state, driver is warned to take control due to the occurrence of a threatening failure. |
| 150 | "Full Auto Driving" superstate, includes blocks 116, 142 and 144, indicating either no failures or relatively minor and short-term deviations requiring attention where some level of fault handling and degradation is employed but LAAD is continued. |

In an exemplary embodiment of the present disclosure, the state flowchart of the system 100 includes a plurality of basic states, a plurality of superstates and a plurality of state transitions 1-22 from the basic states. The plurality of basic states includes ideal states and non-ideal states. The plurality of superstates can include variations between the ideal and non-ideal states of the basic states. The plurality of state transitions 1-22 from the basic states will be discussed in greater detail below.

Under ideal circumstances, the operation of the system 100 is limited to ideal states that include "Ignition Off", "Disabled", "Enabled" and "Normal" states 110, 112, 114 and 116, respectively. In the "Ignition Off" state 110, the ignition to the vehicle is turned off. In the "Disabled" state 112, diagnostic conditions indicating any systematic failures/internal faults that could affect the capability of the system to provide preferred and reliable LAAD, if any, must be cleared before exiting this state and entering the "Enabled" state 114. In the "Enabled" state 114, the system 100 is ready to provide LAAD because the diagnostic conditions do not indicate any systematic failures/internal faults. In the "Normal" state 116, the system 100 is providing LAAD and none of the specific diagnostic conditions exist. For instance, if the driver attentiveness criterion is satisfied and there is no indication that external conditions for LAAD will expire within a predetermined period of time (i.e., TBD2 102 seconds).

In non-ideal circumstances, to precisely specify the behavior of the system 100, the state flowchart of the system 100 includes non-ideal "Warn1", "Warn2", "Warn3", "Inattentive Driver", "Conditions to Expire", "Degraded LAAD" and "Fall Back Position" states 142, 144, 146, 122, 124, 126 and 128, respectively. The non-ideal states specify behavior indicative of the system 100 recognizing that one or more of the specific diagnostic conditions requiring fault handling and degradation exist or about to exist. When the system operates in the "Warn1" state 142, the system 100 is attempting to re-gain the vehicle operator's attention. For instance, the operator's attention may be regained by ringing chimes, verbal notifications through a vehicles entertainment system, vibration of the operator's seat, or some other appropriate notification mechanism. In the interim, the system 100 continues to provide LAAD. Additionally, the "Warn1" state 142 can take affirmative steps to prepare for the possibility that the operator is permanently inattentive. For example, the system 100 can slow the vehicle down and/or increase headway of the vehicle in anticipation that the operator may be permanently inattentive.

When the system 100 is operating under the "Inattentive Driver" state 122, the system 100 has determined that the vehicle operator is inattentive, or it has been determined that it is not preferred to continue waiting for the driver to become attentive. However, the capability of the system 100 to provide LAAD is not impaired. Upon entering the "Inattentive Driver" state 122, the system 100 prepares to start to maneuver the vehicle to a preferred state should the inattentive criteria remain unsatisfied for TBD6 106 seconds (since entering "Inattentive Driver" state 122), or should it be detected that LAAD conditions are about to expire in TBD5 105 seconds and thereby transition to the "Conditions to Expire" state 124" via state transition 10. For instance, the vehicle can be maneuvered to- and stopped on the side of the road. The "Inattentive Driver" state 122 can be optimized to take advantage of the capability of the system 100 to perform LAAD because it has not been impaired. In the interim, the system 100 can continue to take affirmative efforts to regain the operator's attention. Additionally, the system 100 should remain in the "Inattentive Driver" state 122 until a state transition exits the "Engaged" super state 130 and the engaged operation (i.e., state transitions 4 or 20), until TBD6 106 seconds have passed (state transition 22), until LAAD conditions expire (i.e., state transition 16) or until there is an occurrence of a Threatening failure (i.e., state transition 18), occurrence of an Urgent failure (i.e., state transition 14) or occurrence of a Critical failure (i.e., state transition 17).

Threatening, Urgent and Critical failures are discussed in greater detail below with reference to state transitions 14, 17, and 18, respectively.

When the system 100 is operating under the "Warn2" state 144, the system 100 has determined that the external conditions necessary for LAAD are about to expire. For instance, the vehicle may be approaching an intersection, lane-markings are about to disappear, adverse weather conditions, an accident scene, traffic jam, or within the vicinity of emergency response vehicles. The "Warn2" state 144 notifies the driver that control of the vehicle must be taken. Additionally, the "Warn2" state 144 can take affirmative steps to prepare for the possibility of imminent loss of LAAD.

When the system 100 is operating under the "Conditions to Expire" state 124, the system 100 has determined there is an imminent danger that the external conditions necessary for LAAD will expire. Upon entering the "Conditions to Expire" state 124, the system 100 enables LAAD to immediately start to maneuver the vehicle to a preferred state. For instance, the vehicle can be maneuvered to- and stopped on the side of the road. Although, the "Conditions to Expire" state 124 has the same objective to get the vehicle to a preferred state (e.g. stopped on the side of the road) as the "Inattentive Driver" state 122, the "Conditions to Expire" state 124 can employ a different strategy to maneuver the vehicle to reaching the preferred state. For instance, the maneuver should be optimized to take advantage of the capability of the system 100 to perform LAAD, however the strategy to maneuver the vehicle must take into consideration and recognize that conditions for preferred operation of LAAD are imminently ending. In the interim, the system 100 continues to employ efforts to get the operator's attention to take control of the vehicle. Additionally, the system 100 should remain in the "Conditions to Expire" state 124 until a state transition exits the "Engaged" superstate 130 and the engaged operation (i.e., state transitions 4 or 20), until LAAD conditions expire (i.e., state transition 16) or until there is an occurrence of a Threatening failure (i.e, state transition 18), occurrence of an Urgent failure (i.e., state transition 14) or occurrence of a Critical failure (i.e., state transition 17).

When the system 100 is operating under the "Warn3" state 146, the system 100 has determined a Threatening failure has occurred via state transition 18, allowing time for the operator to react and take control of the vehicle. It is either unnecessary or undesirable to immediately begin a maneuver to a preferred state because LAAD is still capable of controlling the vehicle and there is time for the operator to react and take control of the vehicle. When the system 100 has been operating under the "Warn3" state 146 for a predetermined period of time (i.e., TBD7 107 seconds) without driver intervention, the system should transition (i.e., state transition 19) to the "Degraded LAAD" state 126. Additionally, the system should transition to the "Degraded LAAD" state 126 immediately if an Urgent failure occurs while in Warn3 state 146 (i.e., state transition 19).

When the system 100 is operating under the "Degraded LAAD" state 126, the system 100 has determined that an Urgent failure has occurred (i.e., state transition 14) to the system 100 that severely impairs the capability of the system 100 to perform LAAD. Additionally, the system 100 may be operating under the "Degraded LAAD" state 126 if the system 100 has determined that a Threatening failure has occurred (i.e., state transition 18) followed by an Urgent failure, or without operator response or intervention after a predetermined period of time (i.e., TBD7 107 seconds) (i.e., state transition 19) following a threatening failure. Furthermore, the system 100 should remain in the "Degraded LAAD" state 126 until a preferred state is reached (i.e., state transition 15), a state transition exits the "Engaged" superstate (i.e., state transitions 4 or 20), until LAAD conditions expire (i.e., state transition 16) or the occurrence of a Critical failure is determined (i.e., state transition 17).

When the system 100 is operating under the "Fall Back Position" state 128, the system 100 has determined the occurrence of a Critical failure (i.e., state transition 17), LAAD conditions have expired (i.e., state transition 16), or it has been TBD6 106 seconds since the system 100 has been in the "Inattentive Driver" state 122 (i.e., state transition 22) while LAAD was engaged.

Still referring to FIG. 1, the plurality of superstates mentioned above can include the "Ignition Off", "Ignition On", "Engaged", "No Major Failure" and "Full Auto Driving" superstates 110, 120, 130, 140 and 150, respectively. The "Ignition On" superstate 120, also one of the ideal states, includes every basic state of the system when the vehicle ignition is on. The "Engaged" superstate 130 includes the "Normal" state 116, the "Warn1"-"Warn3" states 142, 144 and 146, respectively, and the "Inattentive Driver", "Conditions to Expire", and "Degraded LAAD" states 122, 124 and 126, respectively, wherein operation of LAAD is engaged. The "No Major Failure" superstate 140 includes the "Normal" state 116, the "Warn1" and "Warn2" states 142, 144, respectively, and the "Inattentive Driver" and "Conditions to Expire" states 122, 124, respectively. The "No Major Failure" superstate 140 generally indicates that no threatening, urgent, or critical failures have occurred. The "Full Auto Driving" superstate 150 includes the "Normal" state 116 and the "Warn1" and "Warn2" states 142, 144, respectively, and indicates that either no failures have occurred, or relatively minor and short-term deviations have occurred requiring attention where some level of fault handling and degradation is employed but the system 100 continues use of LAAD.

As discussed above, the exemplary state flowchart of the system 100 includes the plurality of state transitions 1-22 from the basic states. State transition 01 indicates that the ignition is turned on. State transition 02 indicates that a complete set of system diagnostic checks have been performed and there are no diagnostic conditions that indicate any internal faults that could affect the capability of the system 100 to provide preferred and reliable LAAD. In addition, the operator has indicated the desire to enable LAAD and there are no failures that would require the feature to remain in the disabled state 112. State transition 03 indicates that the vehicle operator has requested LAAD and conditions for preferred and reliable LAAD exist, whereas state transition 04 indicates that the vehicle operator has cancelled LAAD when there are no Major failures. Major failures can include Urgent, Threatening, or Critical failures which will be discussed in greater detail below. State transition 04 can occur when the operator indicates by some method the desire to cancel LAAD, including, but not limited to, pressing a button on a Human Machine Interface (HMI), a voice command, or by some other appropriate actions indicative of cancelling LAAD such as a response to an operator brake pedal input, for example. State transition 05 indicates that the ignition is turned off.

State transition 06 indicates that the system 100 has determined that the operator is not satisfying the attentiveness criteria. A determination that an operator is not satisfying the attentiveness criteria can be performed by numerous methods including, but not limited to, determining operator's eye gaze, seat position of operator or orientation of operator's head. State transition 07 indicates that the system 100 has determined that the driver is attentive subsequent to being warned during "Warn1" state 142. State transition 08 indicates that the system 100 has determined that the operator has not satisfied the attentiveness criteria for a period of time (i.e., TBD1 101 secs). For example, the operator has not satisfied the attentiveness criteria for TBD1 101 seconds since entering the "Warn1" state 142. State transition 09 indicates either a preferred state has been reached or the driver has cancelled LAAD subsequent to a Critical failure (state transition 17), LAAD conditions expiring (state transition 16), or the driver has not satisfied the attentiveness criteria for TBD6 106 seconds since entering the "Inattentive Driver" state 122 (state transition 22). When a vehicle is attempting to maneuver into a preferred state during the "Inattentive Driver" state 122 due to driver not satisfying the attentiveness criteria, state transition 10 indicates that the system 100 has determined that the external conditions necessary for the use of LAAD are about to expire in TBD5 105 seconds. State transition 10 therefore, transitions operation of the system 100 from the "Inattentive Driver" state 122 to the "Conditions to Expire" state 124 to take advantage of the capability of the system 100 to use LAAD to mitigate the potential consequences of a driver not satisfying the attentiveness criteria and expiring conditions, while taking into consideration and recognizing that the system 100 capability of use of LAAD is about to expire. State transition 11 indicates that the system 100 has determined that the external conditions necessary for the use of LAAD are about to expire (i.e., in TBD2 102 secs). State transition 12 indicates that the system 100 has determined that the external conditions necessary for the use of LAAD are not about to expire The system 100 can configure state transition 12 to avoid an immediate transition back to the "Warn2" state 144 by indicating that the external conditions will persist for at least a predetermined period of time (i.e., TBD2 102 secs). State transition 13 indicates that the system 100 has determined that there is an imminent danger that the external conditions necessary for the use of LAAD are about to expire in a predetermined period of time (i.e., TBD3 103 sec) or the driver has not satisfied the attentiveness criteria for a period of time (i.e., TBD4 104 sec) while in the "Warn2" state 144.

State transition 14 indicates that the system 100 has determined that an Urgent failure is imminent or has occurred such that LAAD cannot be continued with full functionality and has to operate in a degraded capacity. The system 100 transitions from the "No Major Failure" superstate 140 to the "Degraded LAAD" state 126. Urgent failure is imminent if it is anticipated to occur before an attentive driver is likely to take control. An Urgent failure does not impair the ability of the system to plan and execute a maneuver to reach a preferred state. Otherwise, the failure would be classified as a Critical failure. State transition 15 indicates that the system 100 has completed a maneuver to reach a preferred state after suffering an urgent failure (i.e., state transition 14), a threatening failure followed by an urgent failure (i.e., state transition 19), or a threatening failure followed by being in the "Warn3" state 146 for TBD7 107 seconds. In the "Degraded LAAD" state 126 the system 100 requests the operator to take control of the vehicle and, after reaching the preferred state, LAAD is terminated due to the urgent failure, or the sequence of failures or events stated above degrading the ability to use full operation of LAAD. State transition 16 indicates that the system 100 has determined that the external conditions necessary for the use of LAAD have expired while the system is providing LAAD. The system 100 is thereby transitioned from the "Engaged" superstate 130 to the "Fall Back Position" state 128 and subsequently disabled via state transition 9. State transition 17 indicates that a Critical failure has occurred, wherein the system 100 has only limited ability to continue operation. The operator is warned and requested to take control of the vehicle. State transition 18 indicates that a Threatening failure has occurred; however, an attentive driver still has enough time to take control of the vehicle. State transition 19 indicates that the system 100 has determined that an Urgent failure has occurred, or a period of time (i.e. TBD7 107 sec) has elapsed since the driver was warned in the "Warn3" state 146. State transition 20 indicates that the system has determined that the operator has cancelled LAAD after the occurrence of a Major failure such as the Threatening or Urgent failures or the expiration of the LAAD conditions. The state transition 20 can occur when the operator indicates by some method the desire to cancel LAAD, including, but not limited to, pressing a button on the HMI, a voice command, or by some other appropriate actions indicative of cancelling LAAD such as a response to an operator brake pedal input, for example. The state transition 20 occurs after the occurrence of a major failure (urgent or threatening) as opposed to the state transition 04 that occurs while there are no major failures (i.e., "No Major Failure" state 140). State transition 21 is the transition from the "Enabled" state 114 to the "Disabled" state 112 due to a diagnostic trouble code being set by the system 100 that affects the ability to perform LAAD. State transition 22 is the transition from the "Inattentive Driver" state 122 to the "Fall Back Position" state 128, and occurs when it has been TBD6 106 seconds since the driver has been determined not to satisfy the attentiveness criteria while in the "Inattentive Driver" state 122. The state flowchart of the system 100 further illustrates a plurality of symbolic values TBD1-TBD7 101-107, respectively. After the system determines the operator is not satisfying the attentiveness criteria during use of LAAD (i.e., "Warn1" state 142), TBD1 101 represents the number of seconds that the system 100 spends trying to re-gain the attention of the operator before the system 100 decides that the driver is inattentive and transitions to the "Inattentive Driver" state 122. In a non-limiting example, the TBD1 101 is 5 seconds. TBD2 102 represents the number of seconds before the external conditions necessary for LAAD will expire. In a non-limiting example, TBD2 102 is equal to 15 seconds. TBD3 103 represents the amount of time needed to take action before the external conditions necessary for LAAD expire after entering the "Warn2" state 144. If the external conditions necessary for LAAD expire in TBD3 103 seconds, the system 100 should give up waiting for the operator to re-gain attentiveness, and take over and initiate the maneuver to reach the preferred state independent of the operator. In a non-limiting example, TBD3 103 is 5 seconds. TBD4 104 is the amount of time that the system 100 should give a warning to the driver to take over control of the vehicle 100 before giving up attempts at re-gaining the attentiveness of the operator and initiating the maneuver to reach the preferred state. If the value of TBD4 104 is small, then the system 100 might start to perform a maneuver to a preferred state in response to a momentary interruption of the external conditions necessary for LAAD. In a non-limiting example, TBD4 104 is 2 seconds. After it has been decided that the operator is permanently inattentive (i.e., "Inattentive Driver" state 122), if the LAAD conditions are about to expire in TBD5 105 seconds the system 100 should transition immediately to the "Conditions to Expire" state 124. Thus, TBD5 105 represents the amount of time needed to take action before the external conditions expire. TBD6 106 is the allowed number of seconds since the driver has been determined not to satisfy the attentiveness criteria after entering the "Inattentive Driver" state 122, before initiating a maneuver to reach a preferred state. TBD6 106 represents the amount of time the system 100 should operate in the "Driver Inattentive" state 122 before taking action. In a non-limiting example, TBD6 106 is 15 seconds. TBD7 107 is the allowed number of seconds of warning the system 100 should give the operator to respond to the occurrence of a Threatening failure. TBD7 107 represents the allowed amount of time the system 100 should operate in the "Warn3" state 146, providing that an Urgent failure has not occurred. In a non-limiting example, TBD7 107 is 2 seconds.

Scenarios envisioned include utilizing the system 100 in numerous vehicle operation scenarios including a basic ignition cycle, a temporarily inattentive driver, a permanently inattentive driver, loss of conditions necessary for LAAD, and Urgent failure followed by Critical failure. It will become apparent that the system 100 ensures preferred operation of LAAD when one or possibly more of the specific conditions necessary for LAAD operation no longer exist.

In a non-limiting exemplary scenario, the system 100 is utilized during a basic ignition cycle. The ignition is in the "Ignition Off" state 110 when the operator starts the vehicle. The system 100 transitions via state transition 01 to the "Disabled" state 112 where the system 100 checks for diagnostic conditions that would affect the capability to operate the vehicle in LAAD. The system 100 transitions from the "Disabled" state 112 to the "Enabled" state 114 via state transition 02 when the system 100 does not detect any diagnostic conditions that would exclude the use of LAAD and when the driver requests to enable LAAD. In the "Enabled" state 114, the operator requests use of LAAD, wherein all of the specific conditions necessary for preferred and reliable use of LAAD exist. For instance, the operator can depress a button located on a HMI or steering wheel to request use of LAAD if the driver so desires, or they can give a voice command, or other appropriate indication to initiate LAAD. When LAAD is requested by the driver, the system 100 transitions from the "Enabled" state 114 to the "Normal" state 116 via state transition 03. In the "Normal" state 116 the system 100 applies full autonomous driving. In the "Normal" state 116 the operator of the vehicle can cancel use of LAAD via a button on the HMI, via a voice command, by pressing the brake pedal, or by providing some other appropriate indication. When the operator cancels use of LAAD, the system 100 transitions from the "Normal" state 116 back to the "Enabled" state 114 via state transition 04. After a period of time, the driver reaches his/her destination and manually parks the vehicle and turns off the ignition. When the operator turns off the ignition, the system 100 transitions from the "Enabled" state 114 to the "Ignition Off" state 110 via state transition 05.

In another non-limiting exemplary scenario, an operator of the vehicle not satisfying the attentiveness criteria is detected by the system 100 while operating in the "Full Auto Driving" state 150. When the system 100 is in the "Normal" state 116, the system 100 is providing use of LAAD. After a period of time (e.g. 10 minutes), the system 100 detects that the operator is not satisfying the attentiveness criteria. When the system 100 determines that the operator is not satisfying the attentiveness criteria, the system 100 immediately transitions from the "Normal" state 116 to the "Warn1" state 142 via state transition 06. In the "Warn1" state 142, the system 100 attempts to re-gain the operator's attention. For instance, chimes may ring through the entertainment system of the vehicle, the operator's seat may vibrate, lights may flash on the instrument panel, or some other appropriate method may be used to re-gain the operator's attention. The system 100 continues use of LAAD while in the "Warn1" state 142. After a short period of time (e.g. TBD1 101 seconds or 5 seconds), the system 100 detects that the operator is attentive again. The system 100 transitions back to the "Normal" state 116 via state transition 07 and continues use of LAAD.

In another non-limiting exemplary scenario, a permanently inattentive operator of the vehicle is detected by the system 100 while operating in "Full Auto Driving" state 150. When the system 100 is in the "Normal" state 116, the system 100 is providing use of LAAD. After a period of time (e.g. 10 minutes), the system 100 detects that the operator does not satisfy the attentiveness criteria. When the system 100 determines that the operator does not satisfy the attentiveness criteria, the system 100 immediately transitions from the "Normal" state 116 to the "Warn1" state 142 via state transition 06. In the "Warn1" state 142, the system 100 attempts to re-gain the operator's attention. For instance, chimes may ring through the entertainment system of the vehicle, the operator's seat may vibrate, lights may flash on the instrument panel, or some other appropriate method may be used to re-gain the operator's attention. The system 100 continues use of LAAD while in the "Warn1" state 142. After a period of time (i.e., TBD1 101 or 5 seconds, for example), the system 100 continues to determine that the driver is not satisfying the attentiveness criteria. As a result of the operator's continued inattentiveness, despite a period of warning, the system 100 decides to initiate a transition from the "Warn1" state 142 to the "Inattentive Driver" state 122 via state transition 08. In the "Inattentive Driver" state 122 the system continues to attempt to re-gain the attention of the operator, and plans a maneuver to reach a preferred state. If the attention of the operator has not been re-gained in TBD6 106 seconds, for instance 15 seconds, LAAD then executes the planned maneuver to reach a preferred state. For instance, the maneuver drives the vehicle to the side of the road, and stops the vehicle on the shoulder. The vehicle reaches a preferred state and the system 100 disables LAAD to keep the vehicle in the preferred state.

In yet another non-limiting exemplary scenario, a variant scenario involving a permanently inattentive operator of the vehicle is detected by the system 100 while operating in LAAD. When the system 100 is in the "Normal" state 116, the system 100 is providing use of LAAD. After a period of time (e.g. 10 minutes), the system 100 detects that the operator does not satisfy the attentiveness criteria. When the system 100 determines that the operator does not satisfy the attentiveness criteria, the system 100 immediately transitions from the "Normal" state 116 to the "Warn1" state 142 via state transition 06. In the "Warn1" state 142, the system 100 attempts to re-gain the operator's attention. For instance, chimes may ring through the entertainment system of the vehicle, a voice may attempt to alert the operator, the operator's seat may vibrate, lights may flash on the instrument panel, or some other appropriate means may be used to re-gain the operator's attention. The system 100 continues use of LAAD while in the "Warn1" state 142. After a short period of time (e.g., TBD1 101 seconds or 5 seconds), the operator cancels LAAD (e.g., presses button, presses brake pedal, or uses some other appropriate indication). When the operator cancels LAAD while in the "Warn1" state 142, the system transitions to the "Enabled" state 114 via state transition 04. When in the "Enabled" state 114 the operator can re-request use of LAAD if so desired, or continue manual operation of the vehicle until the end of the trip.

In another non-limiting exemplary scenario, a loss of conditions necessary for LAAD is detected by the system 100 while operating in LAAD. When the system 100 is in the "Normal" state 116, the system 100 is providing use of LAAD. After a period of time (e.g. 10 minutes), the system 100 detects that the external conditions necessary for LAAD will expire in TBD2 102 seconds. The system immediately transitions from the "Normal" state 116 to the "Warn2" state 144 via state transition 11. In the "Warn2" state 144 the system 100 immediately starts alerting the operator to take control of the vehicle. The system will continue to provide LAAD since the external conditions necessary for LAAD have not yet expired. When time progresses to the point when there are TBD3 103 seconds left before these conditions expire, the system decides to initiate a remedial control action and transitions to the "Conditions to Expire" state 124 via state transition 13. After the start of the remedial action, the operator cancels the use of LAAD by one of the methods discussed above, or by some other method. After the operator cancels the use of LAAD, the system 100 transitions from the "Conditions to Expire" state 124 to the "Enabled" state 114 via state transition 04 where the operator can re-request the use of LAAD if so desired, or continue manual operation of the vehicle until the end of the trip.

In yet another non-limiting exemplary scenario, a variant scenario of loss of conditions necessary for LAAD is detected by the system 100 while operating in LAAD. When the system 100 is in the "Normal" state 116, the system 100 is providing use of LAAD. After a period of time (e.g. 10 minutes), the system 100 detects that the external conditions necessary for LAAD will expire in TBD2 102 seconds. The system immediately transitions from the "Normal" state 116 to the "Warn2" state 144 via state transition 11. In the "Warn2" state 144 the system 100 immediately starts alerting the operator to take control of the vehicle. The system will continue to provide LAAD since the external conditions necessary for LAAD have not yet expired. However, immediately upon entering the "Warn2" state 144, the system 100 determines that the external conditions necessary for LAAD are not about to expire. For instance, an approaching traffic jam has cleared or sufficient lane markings re-appear. The system 100 transitions back to the "Normal" state 116 via state transition 12. While operating under the "Normal" state 116 the system 100 suddenly detects that the external conditions required for use in LAAD have expired without any warning. It should be appreciated that it is too late for a controlled maneuver such as what can be provided by the system in the "Inattentive Driver" or "Conditions to Expire" states 122,124, respectively. Therefore, the system must immediately transition from the "Normal" state 116 to the "Fall Back Position" state 128 via state transition 16, wherein the system requests that the operator take control of the vehicle and the use of LAAD is disabled once a preferred state is reached.

In another non-limiting scenario, an Urgent failure followed by a Critical failure is detected by the system 100. While the system 100 is operating in the "Normal" state 116, and thus the system 100 is providing use of LAAD, a sudden Urgent failure is detected. When the Urgent failure is detected the system transitions from the "Normal" state 116 to the "Degraded LAAD" state 126 via state transition 14. By the definition of Urgent failure, the system still has the capability to plan and execute a controlled remedial maneuver. The planned maneuver is executed upon entering the "Degraded LAAD" state 126. After a few seconds, the Urgent failure escalates into a Critical failure before completely finishing the controlled remedial maneuver. The system 100 transitions to the "Fall Back Position" state 128 via state transition 17, where the "Fall Back Position" state 128 requests the operator to take control of the vehicle and disables LAAD once a preferred state is reached. The system 100 thereby transitions to the "Disabled" state 112 via state transition 09 and remains in the "Disabled" state 112 for the rest of the ignition cycle.

It is appreciated, based on the state flowchart of the system 100 for ensuring preferred operation of LAAD and the non-limiting scenarios described above, that a general progression between states with respect to the desirability of these states is evident during the use of LAAD under normal driving conditions. The desirability of a state is based on a consideration of both the operator's ability to control the vehicle and convenience.

As mentioned above, the ideal states that include the "Ignition Off", "Disabled", "Enabled" and "Normal" states 110, 112, 114 and 116, respectively, are the most desirable states. These four ideal states collectively represent an uneventful use of LAAD (i.e., all the conditions necessary for preferred and reliable use of LAAD are present).

The "Warn1" and "Warn2" states 142, 144, respectively, are relatively minor and short-term deviations from the uneventful use of LAAD, and thus, are only slightly less desirable than the uneventful use of LAAD. It is very likely that one or both of these states will be encountered during a single trip in which LAAD is used for an extended period of time (e.g., more than 5 minutes at a time). The occurrence of either the "Warn1" or "Warn2" states 142, 144, respectively, should only result in a minor degradation of the LAAD operation, if any.

The "Warn3" state 146 is a more serious deviation from the uneventful use of LAAD. The design of the system 100 is intended to insure that it is unlikely or highly unlikely that the "Warn3" state 146 will be encountered during a single trip, assuming that the vehicle is well maintained. However, the ability to continue use of LAAD is not impaired, but there is an increased risk of a Critical failure. Hence, it is the mission of this state to achieve a graceful handoff of control to the driver.

"Inattentive Driver", "Conditions to Expire", "Degraded LAAD" and "Fall Back Position" states 122, 124, 126 and 128, respectively, represent more significant deviations from the uneventful use of LAAD than the "Warn3" state 146. The design of the system is intended to make it highly unlikely that these states will be encountered during a single trip in which LAAD is used, assuming that the driver is not incapacitated, not impaired and not deliberately trying to demonstrate or test the LAAD functionality. In the "Inattentive Driver" and "Conditions to Expire" states 122, 124, respectively, the system 100 has stopped trying to re-gain the operator's attention and has initiated a controlled remedial maneuver to get the vehicle to a preferred state. As a result of entering one of these four states, the LAAD operation will be significantly degraded until the operator intervenes to manually take control of the vehicle. This is because entry into one of these four states changes the "mission" of LAAD, wherein the new mission is to get to a preferred state as quickly as possible without increasing risk. "Inattentive Driver", "Conditions to Expire", "Degraded LAAD" and "Fall Back Position" states 122, 124, 126 and 128, respectively, represent a progressively degraded form of LAAD operation, wherein the system 100 has the most capability while in the "Inattentive Driver" state 122 and the least capability while in the "Fall Back Position" state 128.

The Threatening, Urgent and Critical failures discussed above, will be discussed in greater detail herein. State transitions 14, 17, 18 and 19 are defined in terms of the failure type, which can include Urgent, Critical, Threatening, Urgent after Threatening, or being in the "Warn3" state 146 for TBD7 107 seconds after a Threatening failure, respectively. The failure type is determined dynamically by the system 100 at the time of occurrence. The "No Major Failure" superstate 140 in the statechart illustrated in FIG. 1 indicates that either no failures have occurred, no major failures have occurred, or only Minor failures (defined below), have occurred. Thus, the term "Major failure" refers collectively to include Urgent, Critical, Threatening, Urgent after Threatening failures, or being in state "Warn3" for TBD7 seconds after a Threatening failure.

A "Minor failure" does not affect the ability of the system 100 to continue LAAD. There is no reason that the system 100 should anticipate an increased susceptibility to a Critical failure as a result of a "Minor" failure. An example is a corrupted data value stored in RAM that is set to a preferred default value when a failure is detected. More generally, Minor failures include, but are not limited to, failures that can be repaired locally without the need for any further action. The harmless nature of such failures might be the result of some fault tolerance mechanism, or might be the case that the failure is so insignificant that it can be ignored at least until the end of the period of LAAD.

A Threatening failure is a failure that affects the ability of the system 100 to perform LAAD only in the presence of a subsequent failure. For example, the first failure increases the likelihood of a Critical failure occurring compared to the likelihood of a Critical failure occurring at the time when LAAD was transitioned to the "Engaged" superstate 130. Neither the likelihood nor immediacy of the subsequent failure is known. An example of a Threatening failure would be the failure of a critical sensor that has just one redundant alternative. If the system 100 is within the "No Major Failure" superstate 140 at the time of a Threatening failure occurrence, then the system 100 would transition via state transition 18 to the "Warn3" state 146. The word "Threatening" is used to describe this type of failure as an indication that such failures do not necessarily have an immediate effect. Thus, in terms of urgency, Threatening failures are less critical than Urgent failures. However, the consequence of a Threatening failure, when the effect is realized, is not necessarily less than the potential effect of an Urgent failure.

Urgent failures include one of two possibilities. The first possibility includes that the failure immediately degrades the ability of the system 100 to continue LAAD in the "Normal" state 116; however, this failure does not affect the ability of the system to perform a controlled remedial maneuver in the "Degraded LAAD" state 126. For instance, this first possibility of an Urgent failure could include a complete loss of the sensor functionality required for lane changes. Additionally, suppose that the controlled maneuver performed in the "Degraded LAAD" state 126 selected for this failure is degrading to a state without lane change capability and stopping in the current lane, i.e., no lane change. Therefore, the loss of the sensor functionality required for lane changing does not affect the "Degraded LAAD" state 126 operation. The second possibility of Urgent failure includes that the failure immediately degrades the ability of the system 100 to continue LAAD in the "Normal" state 116. This type of Urgent failure also affects the ability of the system 100 to perform a controlled remedial maneuver; however, there is an alternative that is sufficient to perform the controlled remedial maneuver. For instance, the system 100 has completely lost visibility of the lane marking, but the history of video data for the past 10 seconds combined with radar data that senses the position of the preceding vehicle is enough to continue to estimate the position of the vehicle in the lane for a short duration of time to perform a controlled remedial maneuver. If the system 100 is in the "No Major Failure" superstate 140 at the time an Urgent failure occurs, the system 100 can transition to the "Degraded LAAD" state 126 via state transition 14. Likewise, if the Urgent failure has not occurred, but a Threatening failure has occurred during the current trip, then the system transitions to the "Warn3" state 146 via state transition 18.

Critical Failures are not Minor, Threatening or Urgent. In general, a Critical failure immediately has an adverse effect on the ability of the system 100 to continue normal operation of LAAD. The failure is either undetected or uncontrollable by LAAD and the system 100 warns the driver of such situations, if detected, and releases the LAAD capability after the operator takes control of the vehicle.

As mentioned above, the type of failure is determined dynamically by the system 100 at the time of its occurrence, i.e., when the failure is first detected. The type of failure can be a function of: (1) the failure's criticality for the "Normal" state 116 operation of LAAD; (2) the failure's criticality for the system's ability to perform controlled remedial maneuvers in the "Degraded LAAD" and "Fall Back Position" states 126, 128, respectively; and (3) the system's current availability of redundancy or short-term alternatives. While items (1) and (2) can be determined statically (i.e., when the system 100 is designed), item (3) is a dynamic property that must be determined at the moment when the failure occurs. Because item (3) can only be determined dynamically, it is not possible to simply designate each kind of failure (e.g., failure of the left front mid range radar) as one of Minor, Threatening, Urgent or Critical as part of the design. Instead, a software function can be utilized to determine the type of failure that has occurred when a failure is detected. This can be based on determined availability of redundancy, alternative maneuvers, etc. The software function can read all of the current diagnostic signals to make the determination. In other words, the software function must precisely specify a function of the form represented below.

```
if(...........) then current failure type is "Minor"
    else if (....) then current failure type is "Threatening"
    else if (....) then current failure type is "Urgent"
    else current failure type is "Critical"
```

Furthermore, the system 100 can provide an anticipation software function that can determine when an Urgent failure can be anticipated from diagnostic signals. For instance, if a "confidence value" provided by a camera system used to detect lane markings is steadily decreasing, then this "look ahead" information might be used to anticipate an Urgent failure rather than waiting for the Urgent failure to occur. Utilizing the system 100 to anticipate the occurrence of an Urgent failure creates an opportunity for a more graceful transition out of LAAD. In a preferred embodiment, the software function for the determination of the failure type should include a list of all detectable diagnostic conditions that constitute a failure or the likely occurrence of a failure during a current trip. In this example embodiment, the software function should further be configured to derive an equation that can be utilized by the system 100 to dynamically compute the type of failure based upon analysis of the detailed design of the system 100. For example, the following equation expresses a relationship between three sensors such that a failure of Sensor 1 is only Critical if either Sensor 2 or Sensor 3 are NOT okay.

$$\text{Sensor1.failureType is Urgent} = ((\text{Sensor1 is} \sim \text{OK}) \text{ AND}((\text{Sensor2 is} \sim \text{OK})\text{OR}(\text{Sensor3 is} \sim \text{OK}))) \quad [1]$$

In this example embodiment, the software function can further be configured to review the design based on the results of the derived equation to identify modifications to the design that will minimize the urgency of failures in general. Possible changes to the design can include the addition of diagnostic signals and the addition of redundant functionality.

Further embodiments envisioned include defining at least five possible options for transitioning the behavior of the system 100 to a "preferred state". In other words, the system 100 can determine what measures can be taken to reach these states (from the "Inattentive Driver", "Conditions to Expire", "Degraded LAAD", and "Fall Back Position" states 122, 124, 126 and 128, respectively). The system 100 can choose a heuristic strategy, rather than choosing a single option for specific situations, wherein the strategy can choose the best option dynamically depending on the nature of the failure and the environmental conditions. Furthermore, "look ahead" and "plan ahead" analysis (see Look Ahead and Plan Ahead modules 324,322, respectively, in FIG. 3) can be performed such that a decision can be made instantaneously if and when the failure occurs. Depending upon the nature of the failure and the environmental conditions of the vehicle and the system 100 associated therewith, advantages and shortcomings must be evaluated for each of the possible options for transitioning the behavior of the system 100 to the "preferred state". The system 100 is not limited to the five options listed below and can be configured to define other options for transitioning the behavior of the vehicle to a "preferred state" depending upon the nature of the failure and the environmental conditions.

In a first option, LAAD is continued if the operator is still attentive; however, the operator is aggressively prompted to manually take control of the vehicle. The first option is advantageous because it is simple to implement into the system. The first option must take into consideration situations where the vehicle continues LAAD operation when the operator is very unlikely to take control if and when LAAD is unable to continue due to a failure or expiration of LAAD conditions.

A second option is identical to the first option except the vehicle is maneuvered onto an available road exit and then an attempt is made to stop the vehicle, and the hazard lights are turned on. The second option can be preferred over the first option because it limits the duration of risk exposure to the system 100, assuming that an exit along the roadway appears soon. It also offers the advantage over some other options that the vehicle might be stopped in a less dangerous place than the middle or side of the freeway. The second option must be configured to not lead to another traffic situation that may be more dangerous than staying on the freeway (e.g., an entrance to another freeway).

In a third option, the vehicle is required to stay in the lane but to slow down, increase headway and turn the hazard lights on. The third option is advantageous because it is easy to implement and does not require risky maneuvers (e.g., lane changes). The third option must consider other vehicles travelling behind the vehicle on the roadway to avoid a collision from the rear.

In a fourth option, the vehicle is required to maneuver as soon as possible to the side of the road (e.g., shoulder), turn on the hazard lights, slow to a stop, and apply the parking brake. The fourth option is advantageous if the basic capabilities required for completing the maneuver of transitioning the vehicle to the side of the road are available and the side of the road is likely to be a more preferred place than staying in the current lane. The fourth option may be a more predictable outcome than attempting to take the next exit. The fourth option must consider that a shoulder located on the side of the road may not be available and that it may take an indefinite amount of time to find a suitable place to pull over. Multiple lane-change maneuvers are also desirably considered as a factor in heavy traffic.

In a fifth option, the vehicle is required to turn the hazard lights on, honk the horn, pop the hood after stopping, and request roadside assistance through a system such as OnStar. The fifth option is easy to implement and limits the amount of time that LAAD is required to operate. Additionally there are no risk-prone maneuvers, such as changing lanes with a driver not satisfying the attentiveness criteria. The fifth option must consider other vehicles travelling behind the vehicle to avoid risk when the vehicle stops.

As mentioned above, it may be desirable to develop an approach that heuristically chooses the best option depending on the nature of the failure and the environmental conditions. For instance, in the "Inattentive Driver" state, if the traffic is light or moving slowly, the fourth option of moving to the shoulder could be best choice if there is a shoulder available along the side of the road. If a shoulder does not exist on the side of the road, the second option of taking the next exit could be chosen. On the other hand, if traffic is heavy and moving slowly, the fifth option of stopping in the current lane may be the best option to choose. Otherwise, the system 100 may first choose the third option of slowing down, increasing headway, and turning the hazard lights on for a minute or two and then re-evaluate conditions to see if another option is suitable. If no other option is suitable, then stay with the third option and keep re-evaluating periodically.

As mentioned above, the system 100 has the least capability while in the "Degraded LAAD" and/or "Fall Back Position" states 126, 128, respectively. It is therefore an objective of the design of the system 100 to minimize the possibility of encountering conditions to trigger operation of LAAD in the "Degraded LAAD" and "Fall Back Position" states 126, 128, respectively. For instance, the design should minimize the dependence of the system 100 on any conditions that can suddenly become false without some ability of the system 100 to "look ahead" or predict the expiration of such conditions. The design should further use measures such as redundancy, to minimize the expiration of such conditions. The design should maximize the use of opportunities to look ahead or predict the expiration of such conditions. The system 100 should further be designed to take a conservative approach in deciding whether such conditions that may require the vehicle to operate in the "Degraded LAAD" and/or "Fall Back Position" states 126, 128, respectively will continue for the next TBD seconds. For example, the system may be configured to determine if there is an indication that the lane markings might no longer be visible in 120 seconds and to start warning the driver to take control at this point. The system 100 may further take aggressive measures to prompt the operator to take control of the vehicle as soon as possible when it is first detected that the conditions necessary for preferred and reliable LAAD are about to expire and additionally use aggressive measures to discourage the operator from deliberately allowing the system 100 to reach the "Degraded LAAD" and/or "Fall Back Position" states 126, 128, respectively. When a failure occurs, the system can be configured to minimize the possibility of encountering the "Degraded LAAD" and/or "Fall Back Position" states 126, 128, respectively, by using some alternative temporary short-term method to overcome the failure rather than jumping immediately to an Urgent or Critical failure state. For example, if a sudden and complete loss of camera data utilized for lane centering is encountered, the system 100 can utilize historic data (i.e., data for the past 10 seconds, for example) or track movement of cars in front to provide some alternate source of the lost camera data for a period long enough to give the operator a chance to take control of the vehicle. For instance, the system 100 can transition to the "Warn2" and/or "Conditions to Expire" states 144, 124, respectively.

Additionally, the system 100 encountering LAAD operation in the "Fall Back Position" state 128 can be minimized by ensuring that the design of the system 100 minimizes the possibility of faults and avoids single point failures. Furthermore, the system may be limited to a design for the "Degraded LAAD" state 126 with a very high capacity to tolerate faults. Such a design would include minimal dependencies and adequate fault tolerance. The design of the system 100 should further incorporate aggressive measures to prompt the operator to manually take control of the vehicle when an Urgent failure occurs before the Urgent failure escalates into a Critical failure.

Figure 2:
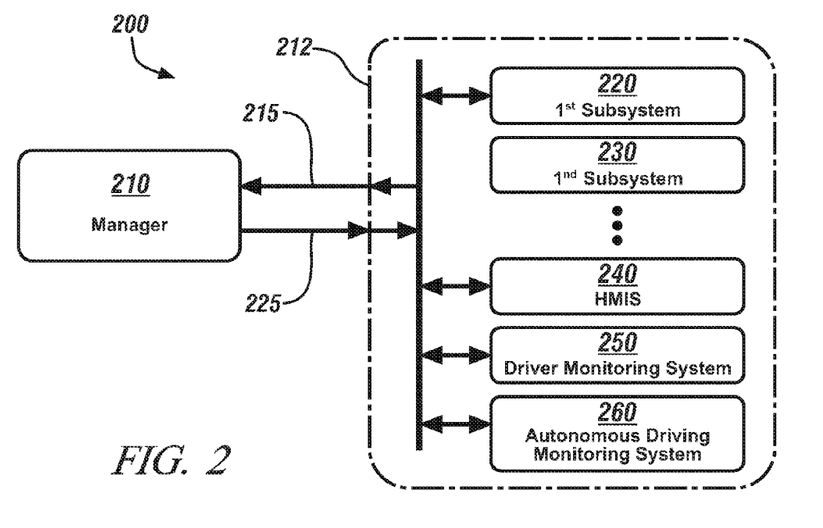
FIG. 2 schematically illustrates an exemplary controller integrated within the state flowchart of FIG. 1, in accordance with the present disclosure.

FIG. 2 schematically illustrates an exemplary controller 200 integrated within the system 100 of FIG. 1 in accordance with the present disclosure. The exemplary controller 200 can define which state to operate the vehicle in (see system 100 of FIG. 1) and which driving mode to operate the vehicle in (see system 300 of FIG. 3). The exemplary controller 200 can monitor and analyze the specific conditions necessary for use of LAAD and ensure fault handling and degradation when one or more of the specific conditions necessary for use of LAAD no longer exists or may no longer exist at some determined point in the future. The exemplary controller 200 includes an exemplary manager 210 having supervisory control over a monitoring and warning system 212 that further includes first and second subsystems 220,230, respectively, a human machine interface system (HMIS) 240, a driver monitoring system 250 and an autonomous driving monitoring system 260. The status of the monitoring and warning system 212 is communicated to the manager 210 and the manager 210 can generate action commands to the monitoring and warning system 212 based upon the monitored information that is communicated there between. As mentioned above, the specific conditions necessary for use of LAAD include operator attentiveness criteria, availability to provide preferred and reliable LAAD and external conditions that allow for preferred use of LAAD. The first and second subsystems 220, 230, respectively, can monitor diagnostic conditions indicative of systematic failures/internal faults that can impede the use of preferred and reliable LAAD, wherein use of fault handling may be required to maneuver the vehicle to a preferred state. The monitored diagnostic conditions can be continuously communicated to the manger 210, wherein the manager 210 can determine the occurrence (or possibility of occurrence) of a Minor, Threatening, Urgent or Critical failure. The manager 210 can be configured to directly fix a detected failure within one of the subsystems 220,230, respectively, if it is feasible to do so. For instance, the occurrence of a minor failure could be repaired locally without the need for any further action. The first and second subsystems 220,230, respectively, can additionally monitor conditions of the vehicle including, but not limited to, brake pedal input, operator torque requests, steering wheel input, and fuel consumption that may affect the controllability of the vehicle, and/or limit the use of, operating the vehicle in LAAD. The exemplary monitoring and warning system 212 is not limited to the first and second subsystems 220,230, respectively, and can include any number of subsystems necessary to adequately monitor diagnostic conditions or other aspects relating to operating the vehicle in a preferred manner under use of LAAD. As mentioned above, the HMIS 240 can contain numerous mechanisms, including but not limited to, buttons, voice activation, etc., for the operator to activate and cancel operation of the system when the operator so desires. For instance, the HMIS 240 can be integrated within an infotainment system, wherein the HMIS 240 can include a button, or other appropriate and feasible means for activating LAAD and a button, or other appropriate and feasible means for canceling LAAD. Additionally, the HMIS 240 can include buttons, or other appropriate and feasible means for controlling the level of LAAD functionality the operator desires. For instance, the operator may desire LAAD to control steering, braking and throttle of the vehicle independent of operator input; however, the vehicle operator can have the ability to select between several different modes of LAAD including, but not limited to, any combinations between adaptive cruise control (ACC), lane keeping or centering, and lane changing. The driver monitoring system 250 includes monitoring the attentiveness of a driver. The driver monitoring system 250 can include, but is not limited to, interior cameras for monitoring the operator's eye gaze and/or head orientation to indicate if the driver is attentive and/or awake. The driver monitoring system 250 can additionally monitor the operator's seat position. The autonomous driving monitoring system 260 primarily monitors the external conditions necessary for preferred use of LAAD. For instance, the autonomous driving monitoring system 260 can monitor and analyze camera information relating to the visibility of lane markers to determine the lane of travel a vehicle is traveling in and if a lane change is necessary. Additionally, the autonomous driving monitoring system 260 can operate in association with GPS monitoring to determine approaching intersections, required lane merges and desired vehicle turns in route, wherein such information from the autonomous driving monitoring system 260 can be relayed to the manger 210 to "look ahead" and "plan ahead" vehicle operating states and autonomous driving modes associated therewith. The exemplary monitoring and warning system 212 communicates with the manager 210, wherein the manager 210 analyzes the monitored information from the monitoring and warning system 212 and can determine if one of the specific conditions for preferred and reliable operation of LAAD no longer exists or is in danger of expiring. The exemplary controller 200 operates in conjunction with the system 100 of FIG. 1, wherein the system 100 determines one of the superstates, and more specifically, one of the basic states for operating the vehicle under use of LAAD. As mentioned above, the exemplary manager 210 can issue command actions based upon the monitored information. For instance, the exemplary manager 210 can warn a driver that is not satisfying the attentiveness criteria (i.e., "Warn1"-"Warn3" states) to take control of a vehicle when use of LAAD in the near future may not be preferred, by illuminating the HMIS 240 within the interior or shaking the driver's seat through the driver monitoring system 250, or through some other appropriate means.

Figure 3:
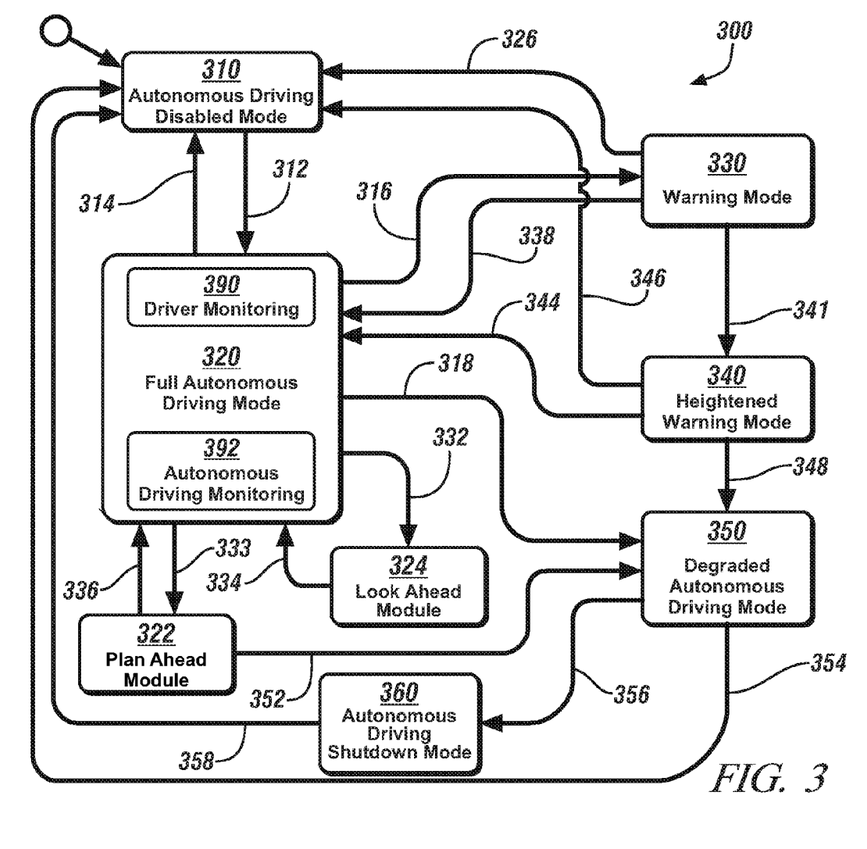
FIG. 3 illustrates an exemplary flowchart of a driving mode system including an autonomous driving disabled mode and autonomous driving modes in the presence and absence of operational concerns utilized in association with and coincident with the state flowchart of FIG. 1 and the exemplary controller of FIG. 2, in accordance with the present disclosure.

FIG. 3 schematically illustrates a driving mode system 300 (hereinafter 'system 300') of autonomous driving modes in the presence and absence of concerns utilized in association with and coincident with the system 100 of FIG. 1 and the exemplary controller 200 of FIG. 2.

Table 2 is provided as a key to FIG. 3 wherein the numerically labeled blocks and the corresponding functions are set forth as follows.

TABLE 2

FIG. 3

| BLOCK | BLOCK CONTENTS |
|---|---|
| 310 | Autonomous Driving Disabled Mode |
| 320 | Full Autonomous Driving Mode: vehicle is operating under LAAD without any specific conditions being violated. |
| 322 | Plan Ahead Module: assesses available |

TABLE 2-continued

FIG. 3

| BLOCK | BLOCK CONTENTS |
|---|---|
| | options for transitioning the behavior of the vehicle to a preferred state when specific conditions are violated or may be violated. |
| 324 | Look Ahead Module: identifies if any specific conditions will be violated in the future, and if so, when. |
| 330 | Warning Mode: Attempts to get operator's attention, assesses options, adjusts warning options based on driver response or lack of response, and escalates or stops warnings. |
| 340 | Heightened Warning Mode: Escalate warnings to re-gain operator's attention and take additional action. |
| 350 | Degraded Autonomous Driving Mode: assess planned options (block 322), phase out of autonomous driving (e.g., notify driver system is shutting down, reduce vehicle speed). Vehicle operating in degraded LAAD. |
| 360 | Autonomous Driving Shutdown Mode |
| 390 | Driver Monitoring: monitors driver attentiveness. |
| 392 | Autonomous Driving Monitor: monitors conditions necessary for preferred and reliable use of LAAD. |

The autonomous driving modes include Autonomous Driving Disabled 310, Full Autonomous Driving Mode, Warning Mode, Heightened Warning Mode, Degraded Autonomous Driving Mode and Autonomous Driving Shutdown Mode 310, 320, 330, 340, 350, and 360, respectively. FIG. 3 further includes Look Ahead and Plan Ahead Modules 324 and 322, respectively. The Full Autonomous Driving mode 320 includes use of LAAD having the ability to control steering, braking and throttle of the vehicle independent of operator input; however, the vehicle operator can have the ability to select between several different modes of LAAD including, but not limited to, any combinations between adaptive cruise control (ACC), lane keeping or centering, and lane changing. The Warning Mode, Heightened Warning Mode, Degraded Autonomous Driving Mode and Autonomous Driving Shutdown Mode 330, 340, 350 and 360, respectively, include situations where LAAD is employed but one or more of the specific conditions necessary for preferred and reliable use of LAAD no longer exist or are determined to expire in TBD seconds, and thus, some level of fault handling exists. Likewise, the Warning Mode, Heightened Warning Mode, Degraded Autonomous Driving Mode, and Autonomous Driving Shutdown Mode 330, 340, 350 and 360, respectively, correspond to one or more of the "Warn1", "Warn2" or "Warn3", "Inattentive Driver", "Conditions to Expire", or "Degraded LAAD" basic states 142, 144, 146, 122, 124 or 126, respectively, within the "Engaged" superstate 130, or the "Fall Back Position" basic state 128 of FIG. 1. Likewise, when the vehicle is operating in the Autonomous Driving Disabled mode 310, the system 100 is operating in the "Disabled" state 112 of FIG. 1 where the operator has manually disabled use of LAAD.

The vehicle can enter operation into Full Autonomous Driving mode 320 (e.g., enabling the Full Autonomous Driving mode) from the Autonomous Driving Disabled mode 310 via transition 312 when the operator of the vehicle requests autonomous driving and the plurality of specific conditions for preferred and reliable use of LAAD are all satisfied. The request can be performed by the operator in numerous appropriate ways, including but not limited to accessing an activation button located on the HMIS 240 illustrated in FIG. 2. Likewise, the vehicle can exit Full Autonomous Driving mode 320 (e.g., disabling the Full Autonomous Driving mode) when the operator requests to disable autonomous driving (e.g., via transition 314) or when at least one of the specific conditions necessary for preferred and reliable use of LAAD is violated or will become violated (e.g., via transitions 316 or 318. The request to disable can be performed by the operator in numerous appropriate ways, including but not limited to, accessing a deactivation button located on the HMIS 240. Alternatively, the operator of the vehicle can disable autonomous driving by applying pressure to a brake pedal, for example, or through some other appropriate means. Exiting Full Autonomous Driving mode 320 to the Autonomous Driving Disabled mode 310 is performed via transition 314.

When the vehicle is operating in the Full Autonomous Driving mode 320, the vehicle is operating under LAAD without any of the specific conditions being violated. While the vehicle is operating in the Full Autonomous Driving mode 320, Driver Monitoring 390 continuously monitors driver attentiveness. If Driver Monitoring 390 determines that the driver is not satisfying the attentiveness criteria, the operating mode can transition to Warning Mode 330. Autonomous Driving Monitor 392 monitors a plurality of conditions necessary for preferred and reliable use of LAAD, including system diagnostics, and conditions required to maintain preferred and reliable use of LAAD.

The operating mode can transition to Warning Mode 330 when at least one of the specific conditions not having an immediate adverse effect on the ability of the system to continue operation in LAAD is violated or will become violated, the Warning Mode 330 configured to gain the attention of the operator, assess options, adjust warning options based on driver response or lack of response, and to escalate or stop warnings, for example. For instance, if driver monitoring 390 determines that the operator is not satisfying the attentiveness criteria, the operating mode can transition to the Warning Mode 330 via transition 316. If the Autonomous Driving Monitor 392 determines through system diagnostics that no major failure exists, but a minor fault or deviation has occurred that requires operator attention, the operating mode can transition to the Warning Mode 330 via transition 316. If the occurrence of a major failure requiring shutdown of autonomous driving is determined, the vehicle operating mode transitions to the Degraded Autonomous Driving mode 350 via transition 318. If the autonomous driving monitor 392 determines that conditions for autonomous driving are expiring, the operating mode can transition to the Warning Mode 330 via transition 316. If the operator disables autonomous driving, the operating mode transitions to Autonomous Driving Disabled 310 via transition 314.

When the vehicle is operating in the Full Autonomous Driving mode 320, the system 300 can utilize the continuously monitored information from Driver Monitoring 390 and Autonomous Driving Monitor 392 in association with a Look Ahead module 324, via link 332, to identify if any of the specific conditions will be violated in the future, and if so, when. If a specific condition is violated, or will be violated in the future, the Look Ahead module 324 can identify necessary transitions into a "preferred state", wherein the status is communicated to the Full Autonomous Driving mode 320 via link 334. For instance, the autonomous driving monitor 392 utilizing a camera for example, or some other appropriate means, to detect lane markings, can also be utilized in association with the Look Ahead module 324 to determine that lane markings may not be visible after a period of time due to increasingly snowy conditions for example, wherein this information can be utilized if a transition into a "preferred state" is requested in the future.

Furthermore, when the vehicle is operating in the Full Autonomous Driving mode 320, the system 300 can utilize the continuously monitored information from Driver Monitoring 390 and Autonomous Driving Monitor 392 and the information from the Look Ahead module 324 in association with a Plan Ahead module 322 to plan alternative preferred maneuvers and assess their feasibility for immediate application when any of the specific conditions are violated or may be violated at some point in the future. The Plan Ahead module 322 operates in conjunction with the system 100 of FIG. 1, and can assess any of the available options for transitioning the behavior of the vehicle to a "preferred state". In other words, the Plan Ahead module 322 can determine what future measures can be taken, based upon assessing the available options, if the vehicle operating mode is transitioned to the Degraded Autonomous Driving mode 350 (i.e., one of the preferred states of FIG. 1) via transition 318. Operation of the Plan Ahead module 322 can be performed independent of operator attentiveness or input. The Full Autonomous Driving Mode 320 continuously monitors the Plan Ahead module 322 via link 333 and the Plan Ahead module 322 communicates status back to the Full Autonomous Driving module 320 via link 336. The Plan Ahead module 322 communicates status to the Degraded Autonomous Driving mode 350 via link 352.

When the vehicle is operating in the Warning Mode 330, the system 300 can attempt to get the operator's attention, assess options evaluated in the Look and Plan Ahead modules 324, 322, respectively, adjust warning options based on operator response (or lack thereof) or escalate (or stop) warnings to the operator. If the operator becomes attentive, the operator can disable autonomous driving via transition 326 by one of the methods mentioned above, or by some other appropriate method. Likewise, the system 330 can transition back to the Full Autonomous Driving mode 320 via transition 338 if the operator's attention is regained, external conditions are no longer expiring or a minor fault is removed. If the operator does not become attentive after a period of time has elapsed since transitioning to Warning Mode 330, the operating mode of the vehicle transitions to Heightened Warning Mode Autonomous Driving 340 via transition 341. The Heightened Warning Mode 340 is configured to escalate warnings to regain the attention of the operator and take additional action as required.

When the vehicle is operating in the Heightened Warning Mode 340, the system 300 can further escalate warnings to re-gain the operator's attention and take further action such as assessing options evaluated in the Look and Plan Ahead modules 324, 322, respectively, for imminent use. If the operator becomes attentive, the operator can disable autonomous driving, via transition 346, by one of the methods mentioned above, or by some other appropriate method. If the operator does not become attentive after a predetermined period of time has elapsed, the operating mode of the vehicle transitions to the Degraded Autonomous Driving mode 350. The Heightened Warning Mode 340 can represent the option wherein the vehicle continues to operate under LAAD as if the operator is attentive, except the operator of the vehicle is aggressively prompted to take control of the vehicle.

When the vehicle is operating in the Degraded Autonomous Driving mode 350, the system 300 assesses the appropriate options from the Plan Ahead module 322, via link 352, for immediate use because the attention of the driver has not been re-gained in either the Warning Mode or the Heightened Warning Mode 330, 340, respectively, or a physical failure has occurred that requires shutdown of autonomous driving. The system 300 begins to phase out of LAAD due to one or more of the specific conditions being violated and the operator is not available to manually maneuver the vehicle to a "preferred state". The fault handling and degradation strategy in the Degraded Autonomous Driving mode 350, based upon the best option assessed in the Plan Ahead module 322, can, as one option, slow the vehicle down and maneuver the vehicle to the side of the road and stop, for example. Likewise, if maneuvering the vehicle to the side of the road is not feasible, the vehicle may be slowed and stopped in the lane. Once the vehicle reaches a "preferred state" by utilizing one of the available options, autonomous driving is shutdown and the vehicle operating mode is transitioned to the Autonomous Driving Shutdown mode 360 via transition 356. In addition, if in the Degraded Autonomous Driving Mode 350, and the driver disables (e.g., cancels) autonomous driving, then a transition 354 to Autonomous Driving Disabled mode occurs, and autonomous driving is disabled.

When the vehicle is operating in the Autonomous Driving Shutdown mode 360, the vehicle remains in this mode until reaching a "preferred state", and then transitions to the Autonomous Driving Disabled mode 310 via transition 358.

Figure 4:
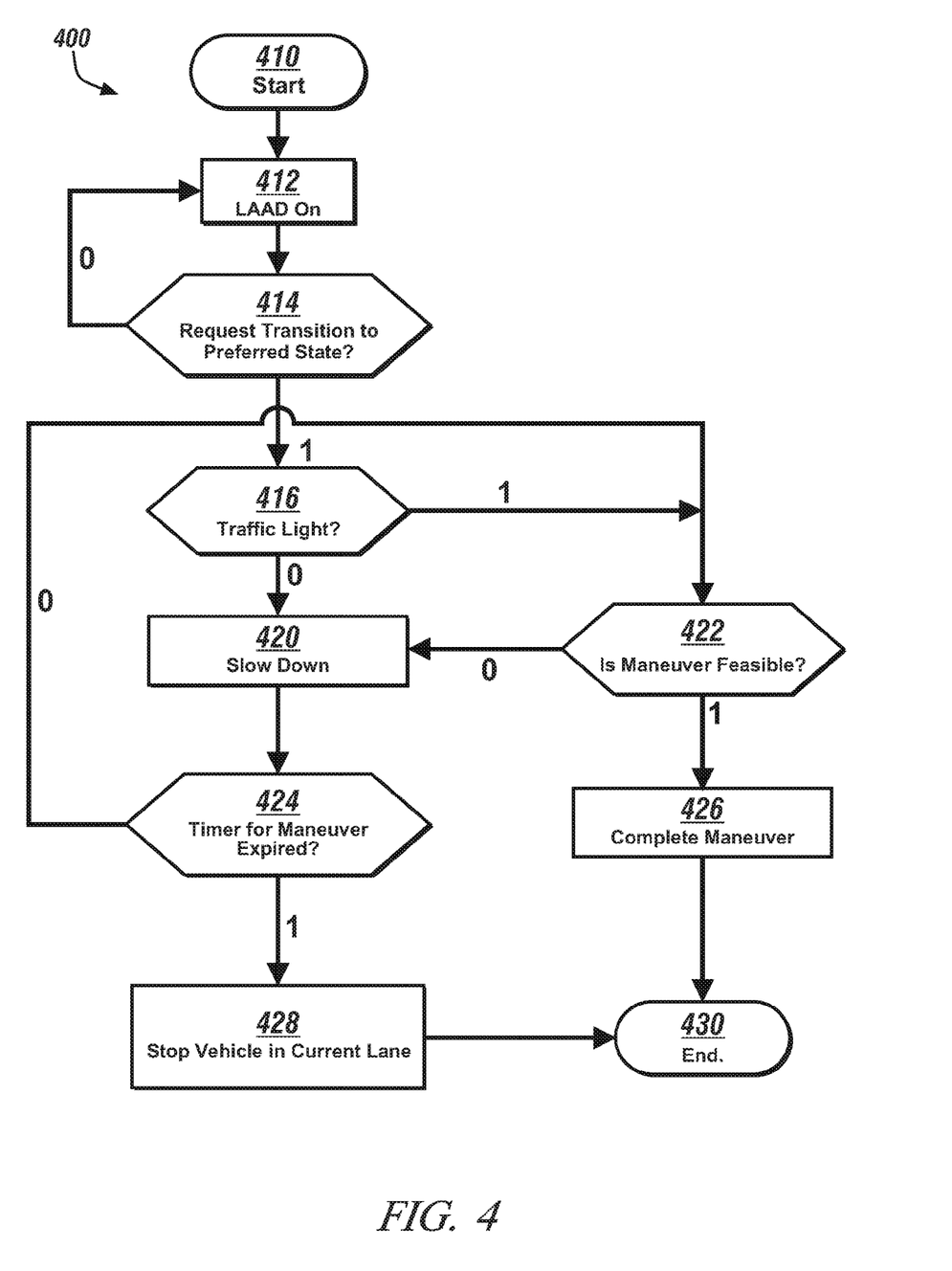
FIG. 4 illustrates an exemplary assessment flowchart depicting an assessment for a lane change maneuver to the side of the road, or for stopping in the present lane if a lane change maneuver is not feasible or possible, for a vehicle operating in limited-ability autonomous driving, in accordance with the present disclosure.

FIG. 4 illustrates an exemplary assessment flowchart 400 depicting an assessment for a lane change maneuver to the side of the road of a vehicle operating in fault handling and degradation mode, in accordance with an exemplary example of the present disclosure. The assessment can be performed by the Plan Ahead module 322 in association with the Look Ahead module 324 of FIG. 3 and the system 100 of FIG. 1, wherein the assessment includes evaluating the available options received from the Plan Ahead module 322. For instance, upcoming intersections and the external environment of the vehicle must be carefully evaluated by the Plan Ahead module 322 in order for the fault handling and degradation strategy to maneuver the vehicle to the side of the road onto a shoulder. Additionally, internal faults (or the possibility thereof) must be assessed by the monitoring of diagnostic conditions to determine the feasibility of performing such maneuvers when fault handling and degradation is employed.

Table 3 is provided as a key to FIG. 4 wherein the numerically labeled blocks and the corresponding functions are set forth as follows.

TABLE 3

FIG. 4

| BLOCK | BLOCK CONTENTS |
|---|---|
| 410 | Start block |
| 412 | Limited Autonomous Driving ON |
| 414 | Request Transition to Preferred State?: <br> "0" = "no", reverts back to block 412 <br> "1" = "yes", to decision block 416 |
| 416 | Is Traffic Light?: <br> "0" = "no", transition to block 420 <br> "1" = "yes", transition to decision block 422 |
| 420 | Slow Down and Turn Hazard Lights On |
| 422 | Is Maneuver Feasible?: <br> "0" = "no", transition to block 420 <br> "1" = "yes", completed in block 426 |
| 424 | Timer for Maneuver Expired? <br> "0" = "no", transition to decision block 422 <br> "1" = "yes", transition to block 428 |
| 426 | Complete Maneuver |
| 428 | Stop Vehicle in Current Lane |
| 430 | End block: Preferred State |

The assessment flowchart 400 transitions from the start block 410 to a block 412 (i.e., "Limited Autonomous Driving ON") indicating that LAAD is employed. The block 412 indicates that the vehicle is operating under some level of LAAD and may also be utilizing the fault handling and degradation strategy. Decision block 414 indicates whether a "Request Transition to Preferred State" is requested. If the decision block is a "0" indicating a "no", the flowchart reverts back to the block 412. If the decision block 414 is a "1" indicating a "yes" (i.e., "Request Transition to Preferred State"), the flow chart evaluates the traffic conditions in decision block 416 (i.e., "Light Traffic?"). When decision block 414 is a "1" indicating a "yes", the system 100 is entering one of the preferred states, wherein the options are being continuously evaluated and planned by the Look and Plan Ahead Modules 324, 322, respectively, of FIG. 3. If the decision block 416 (i.e., "Light Traffic") is a "0" indicating a "no", the flow chart transitions to block 420. If the decision block 416 is a "1" indicating a "yes", the flow chart 400 transitions to decision block 422. The decision block 422 indicates whether the maneuver, such as to the shoulder of the road, is feasible or not. For instance, a camera or GPS with map data may indicate that no shoulder exists on the road at which the vehicle is travelling, or radar could indicate that a vehicle in an adjacent lane is temporarily obstructing the maneuver even if a shoulder does exist. If the decision block 422 is a "1" indicating a "yes", the maneuver is feasible and is completed in block 426 (i.e., "Complete Maneuver"). If either the decision block 416 is a "0" indicating a "no" (e.g., traffic is not light) or the decision block 422 is a "0" indicating a "no" (e.g., lane change maneuver to shoulder is not feasible), the assessment flowchart 400 transitions to the block 420 (i.e., "Slow Down and Turn Hazard Lights On"). Hence, the block 420 indicates that due to heavy traffic and/or the unavailability to perform a lane change maneuver, for example, the most feasible preferred option is to currently slow down and turn on hazard lights to indicate that the vehicle is slowing down and approaching a stop. Decision block 424 (i.e., "Timer for a maneuver, such as Lane Change to Shoulder Expired") assesses a threshold for determining when the availability or operability for the maneuver, such as a lane change to a shoulder has expired. For instance, the decision block 422 may have determined that a shoulder exists for the next quarter mile, but adjacent vehicles are currently obstructing any maneuvers to the shoulder of the road. In another instance, the decision block 424 may have determined that due to an internal failure, fault handling and degradation only has the operability to perform the maneuver before LAAD completely shuts down after a predetermined period of time elapses. Thus, if the decision block 424 is a "0" indicating "no", that there is still potentially time for the maneuver, such as a lane change to the shoulder of the road, the flow can revert back to block 422 and reassess the possibility of a lane change maneuver. However, if the decision block 424 is a "1" indicating a "yes", the vehicle stops in the current lane in block 428. Whether the vehicle has stopped in the current lane (i.e., block 428) or has completed a maneuver to the side of the road (i.e., block 426) the flowchart ends at block 430 (i.e., "End") where the vehicle has reached a "preferred state". Therefore, the assessment flowchart as exemplary, illustrates that a vehicle operating in fault handling and degradation mode, can be maneuvered to enter a "preferred state" when one or more of the specific conditions have been violated or are in danger of being violated.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for ensuring operation of a limited-ability autonomous driving enabled vehicle, comprising:
   enabling the limited-ability autonomous driving wherein the vehicle has an ability to control steering, braking and throttle independent of operator input, the limited-ability autonomous driving enabled when:
      an operator of the vehicle requests to enable the limited-ability autonomous driving, and
      a plurality of specific conditions necessary for preferred and reliable use of limited-ability autonomous driving are all satisfied, one of the specific conditions satisfied when monitored driver attentiveness criteria indicates the driver is attentive;
   when the limited-ability autonomous driving is enabled:
      monitoring the plurality of specific conditions; and
      initiating a fault handling and degradation strategy configured to maneuver the vehicle to a preferred state if the driver is unable to manually control the vehicle when at least one of the specific conditions necessary for preferred and reliable use of limited-ability autonomous driving is either violated or will become violated.

2. The method of claim 1 wherein monitoring the plurality of special conditions necessary for preferred and reliable use of limited-ability autonomous driving comprises:
   monitoring the operator attentiveness criteria;
   monitoring diagnostic conditions for no internal faults impeding the availability of preferred and reliable use of limited-ability autonomous driving; and
   monitoring external conditions allowing preferred and reliable use of limited-ability autonomous driving.

3. The method of claim 1 wherein initiating the fault handling and degradation strategy when at least one of the specific conditions necessary for preferred and reliable use of limited-ability autonomous driving is either violated or will become violated comprises:
   monitoring the operator attentiveness criteria;
   determining the operator is inattentive based on the monitoring operator attentiveness criteria;
   initiating a warning configured to re-gain the attention of the operator; and
   determining one of an inattentive driver if the warning configured to re-gain the attention of the operator is unsuccessful or an attentive driver if the warning configured to re-gain the attention of the operator is successful.

4. The method of claim 3 wherein the method in response to determining an inattentive driver if the warning configured to re-gain the attention of the operator is unsuccessful further comprises:
   planning a future maneuver to reach the vehicle to the preferred state comprising:
      activating escalated warnings; and one of
         utilizing unimpaired limited-ability autonomous driving to maneuver the vehicle to reach the preferred state; and
         utilizing a time constrained use of limited-ability autonomous driving to start to maneuver the vehicle to a preferred state when it is detected external conditions necessary for preferred and reliable limited-ability autonomous driving will expire in a period of time.

5. The method of claim 1 wherein initiating the fault handling and degradation strategy when at least one of the specific conditions necessary for preferred and reliable use of limited-ability autonomous driving is either violated or will become violated comprises:
monitoring external conditions allowing for preferred and reliable use of limited-ability autonomous driving;
determining the external conditions allowing for preferred and reliable use of limited-ability autonomous driving will expire in a period of time based on the monitored external conditions;
initiating a warning configured to gain the attention of the operator; and
determining one of
an imminent danger that external conditions necessary for limited-ability autonomous driving will expire since initiating the warning if the warning configured to gain the attention of the operator is unsuccessful, and
determining an attentive driver if the warning configured to gain the attention of the operator is successful.

6. The method of claim 5 wherein the method in response to determining an imminent danger that external conditions necessary for limited-ability autonomous driving will expire since initiating the warning further comprises:
planning a future maneuver to reach the vehicle to the preferred state comprising:
activating escalated warnings; and one of
utilizing unimpaired limited-ability autonomous driving to maneuver the vehicle to reach the preferred state, and
utilizing a time constrained use of limited-ability autonomous driving to start to maneuver the vehicle to a preferred state when it is detected external conditions necessary for preferred and reliable limited-ability autonomous driving will expire in a period of time.

7. The method of claim 1 wherein initiating the fault handling and degradation strategy when at least one of the specific conditions necessary for preferred and reliable use of limited-ability autonomous driving is either violated or will become violated comprises:
monitoring diagnostic conditions for no internal faults impeding the availability of preferred and reliable use of limited-ability autonomous driving;
determining one of a threatening failure, an urgent failure, a critical failure or expired limited-ability autonomous driving capabilities based on the monitored diagnostic conditions; and
initiating the fault handling and degradation strategy based on the determined one of the threatening failure, the urgent failure, the critical failure or the expired limited-ability autonomous driving capabilities.

8. The method of claim 7 wherein initiating the fault handling and degradation strategy based on the determined one of the threatening failure, the urgent failure, the critical failure or the expired limited-ability autonomous driving capabilities comprises:
determining a threatening failure where limited-ability autonomous driving is still capable of controlling the vehicle, the threatening failure affects the ability of the system to perform limited-ability autonomous driving only in the presence of a subsequent failure;
initiating a warning configured to re-gain the attention of the operator based on the determined threatening failure;
determining one of
a degraded limited-ability autonomous driving operation resulting in degraded performance of preferred and reliable limited-ability autonomous driving when one of a period since initiating the warning to re-gain the attention of the operator has elapsed and an urgent failure is detected, and
a cancellation of limited-ability autonomous driving; and
maneuvering the vehicle to the preferred state based on the determined degraded limited-ability autonomous driving operation.

9. The method of claim 7 wherein initiating the fault handling and degradation strategy based on the determined one of the threatening failure, the urgent failure, the critical failure or the expired limited-ability autonomous driving capabilities comprises:
determining an urgent failure immediately degrading the ability to continue limited-ability autonomous driving;
determining degraded limited-ability autonomous driving operation resulting in degraded performance of preferred and reliable limited-ability autonomous driving based on the determined urgent failure; and
maneuvering the vehicle to the preferred state based on the determined degraded limited-ability autonomous driving operation.

10. The method of claim 7 wherein initiating the fault handling and degradation strategy based on the determined one of the threatening failure, the urgent failure, the critical failure or the expired limited-ability autonomous driving capabilities comprises:
determining a critical failure having an immediate adverse effect on the ability of the system to continue operation in limited-ability autonomous driving;
determining a fall-back position based on the determined critical failure; and
maneuvering the vehicle to the preferred state and disabling limited ability autonomous driving based on the determined fall-back position.

11. Method for ensuring operation of a limited-ability autonomous driving vehicle in a plurality of operating modes, comprising:
enabling a full autonomous driving mode wherein the vehicle has ability to control steering, braking and throttle independent of operator input, the full autonomous driving mode enabled when an operator of the vehicle requests limited-ability autonomous driving and a plurality of specific conditions necessary for preferred and reliable use of limited-ability autonomous driving are all satisfied, one of the specific conditions satisfied when monitored predetermined attentiveness criteria indicates the driver is attentive; and
disabling the full autonomous driving mode when at least one of the specific conditions necessary for preferred and reliable use of limited-ability autonomous driving is violated or will become violated.

12. The method of claim 11 further comprising:
monitoring look ahead information in each of the plurality of operating modes to anticipate if one of the specific conditions will become violated and when such violation will occur.

13. The method of claim 11 further comprising:
monitoring plan ahead information in each of the plurality of operating modes to plan alternative preferred maneuvers and assess feasibility for immediate application when one of the specific conditions is violated or may become violated.

14. The method of claim 11 wherein satisfaction of the plurality of specific conditions comprises:
- the operator satisfying the predetermined attentiveness criteria indicating the driver is attentive;
- no existing internal fault impeding the availability of preferred and reliable use of limited-ability autonomous driving;
- no incipient internal fault impeding the availability of preferred and reliable use of limited-ability autonomous driving; and
- satisfaction of external conditions necessary for preferred and reliable use of limited-ability autonomous driving.

15. The method of claim 11 wherein disabling the full autonomous driving mode when at least one of the specific conditions necessary for preferred and reliable use of limited-ability autonomous driving is violated or will become violated comprises:
- transitioning to a warning mode configured to gain the attention of the operator when said at least one of the specific conditions violated or to be violated comprises a condition not having an immediate adverse effect on the ability of the system to continue operation in limited-ability autonomous driving.

16. The method of claim 15 further comprising:
- transitioning to a heightened warning mode configured to escalate warnings to gain the attention of the operator and assess look ahead and plan ahead information for imminent use if the attention of the operator has not been re-gained after a period of time since transitioning to the warning mode; and
- transitioning to one of
  - the full autonomous driving mode if one of the attention of the operator is regained and the specific conditions are no longer violated or to be violated; and
  - a degraded autonomous driving mode configured to maneuver the vehicle to a preferred state when the attention of the operator is not regained.

17. The method of claim 11 wherein disabling the full autonomous driving mode when at least one of the specific conditions necessary for preferred and reliable use of limited-ability autonomous driving is violated or will become violated comprises:
- transitioning to a degraded autonomous driving mode configured to maneuver the vehicle to a preferred state when said at least one of the specific conditions violated or to be violated comprises a condition having an immediate adverse effect on the ability of the system to continue operation in limited-ability autonomous driving.

18. The method of claim 17 wherein the degraded autonomous driving mode configured to maneuver the vehicle to a preferred state comprises:
- assessing maneuver options for immediate use based on continuously monitored look ahead and plan ahead information; and
- selecting a most feasible one of said assessed maneuver options.

19. Apparatus for ensuring operation of a limited-ability autonomous driving enabled vehicle, comprising:
- a controller:
  - enabling the limited-ability autonomous driving wherein the vehicle has ability to control steering, braking and throttle independent of operator input, the limited-ability autonomous driving enabled when:
    - an operator of the vehicle requests to enable the limited-ability autonomous driving, and
    - a plurality of specific conditions necessary for preferred and reliable use of limited-ability autonomous driving are all satisfied, one of the specific conditions satisfied when monitored driver attentiveness criteria indicates the driver is attentive;
  - when the limited-ability autonomous driving is enabled:
    - monitoring the plurality of specific conditions necessary for preferred and reliable use of limited-ability autonomous driving; and
    - initiating a fault handling and degradation strategy configured to maneuver the vehicle to a preferred state if the driver is unable to manually control the vehicle when at least one of the plurality of specific conditions necessary for preferred and reliable use of limited-ability autonomous driving is either violated or will become violated.

* * * * *